(12) United States Patent
Bakale et al.

(10) Patent No.: US 9,063,748 B1
(45) Date of Patent: Jun. 23, 2015

(54) SYSTEM, METHOD, AND COMPUTER PROGRAM FOR ALLOWING A PLURALITY OF APPLICATION PROGRAMMING INTERFACE (API) VERSIONS TO INTERACT WITH A SINGLE VERSION OF IMPLEMENTATION CODE

(71) Applicant: Amdocs Software Systems Limited, Dublin (IE)

(72) Inventors: Rahul Dattatray Bakale, Kaylan-West (IN); Nir Dothan, Raanana (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/199,905

(22) Filed: Mar. 6, 2014

Related U.S. Application Data (60) Provisional application No. 61/803,117, filed on Mar. 19, 2013.

(51) Int. Cl.
 - G06F 9/45 (2006.01)
 - G06F 9/54 (2006.01)
 - G06F 9/44 (2006.01)

(52) U.S. Cl.
 CPC .. G06F 8/40 (2013.01); G06F 8/71 (2013.01); G06F 9/541 (2013.01)

(58) Field of Classification Search
 CPC ..... G06F 9/541; G06F 17/30; G06F 17/3023; G06F 17/3056; G06F 17/30292; G06F 17/30297; G06F 17/30309; G06F 17/30386
 USPC .......................................................... 717/136
 See application file for complete search history.

(56) References Cited

U.S. PATENT DOCUMENTS

| | | | |
|---|---|---|---|
| 7,827,201 B1 * | 11/2010 | Gordon et al. | 707/792 |
| 8,533,170 B1 * | 9/2013 | McHugh et al. | 707/695 |

(Continued)

OTHER PUBLICATIONS

Newton et al., "A Common Schema for Internet Registry Information Service Transfer Protocols (RFC4991)", IPCOM000156875D, 2007, 15pg.*

(Continued)

*Primary Examiner* — Ryan Coyer
(74) *Attorney, Agent, or Firm* — Zilka-Kotab, PC (57) ABSTRACT

A system, method, and computer program product are provided for allowing a plurality of application programming interface (API) versions to interact with a single version of implementation code. A system, method, and computer program product are provided for allowing a single version of core code to interact with a plurality of customization versions. In use, at least one first data object is received. Additionally, it is determined whether the at least one first data object is associated with a first data object version corresponding to a first data structure associated with a first API version. Additionally, it is determined whether the first data object version associated with the first data structure is compatible with an implementation code, the implementation code being compatible with a second data object version corresponding to a second data structure associated with a second API version. Moreover, the at least one first data object associated with the first data object version is automatically converted to the second data object version corresponding to the second data structure, such that the at least one first data object is compatible with the implementation code and the second API version. Computer generated code is used to convert data objects to compatible versions. The versions of data objects and data structures are determined dynamically at runtime. The data objects are converted to compatible versions dynamically at runtime.

18 Claims, 7 Drawing Sheets

(56) References Cited

U.S. PATENT DOCUMENTS

| | | | |
|---|---|---|---|
| 8,677,083 B1* | 3/2014 | McHugh et al. | 711/156 |
| 2005/0149543 A1* | 7/2005 | Cohen et al. | 707/100 |
| 2007/0043715 A1* | 2/2007 | Kaushik et al. | 707/4 |
| 2014/0025713 A1* | 1/2014 | Avati et al. | 707/827 |

OTHER PUBLICATIONS

Reschke et al., "Datatypes for Web Distributed Authoring and Versioning (WebDAV) Properties (RFC4316)", IPCOM000132276D, 2005, 13pg.*

* cited by examiner

SYSTEM, METHOD, AND COMPUTER PROGRAM FOR ALLOWING A PLURALITY OF APPLICATION PROGRAMMING INTERFACE (API) VERSIONS TO INTERACT WITH A SINGLE VERSION OF IMPLEMENTATION CODE

CLAIM OF PRIORITY

This application claims the benefit of U.S. Provisional Application No, 61/803,117, filed Mar. 19, 2013, the entire contents of which are incorporated herein by reference.

FIELD OF THE INVENTION

The present invention relates to communication between devices, and more particularly to allowing multiple versions of an API to interact with a single version of a software program.

BACKGROUND

Introduction of new functionalities to a software program may be accompanied with changes in data structures. Changes in data structures may break backwards compatibility with existing clients and/or customizations in existing installations. Such data structure changes typically force clients and customizations to align their code, which may result in costly development and testing cycles, often spanning multiple software vendors and system integrators.

One way to mitigate this problem is to expose multiple versions of APIs to be used by clients and customizations. Once a new version of an API is available, clients and customizations can be gradually upgraded to use the new API, and until they do so, they may use the old API. However, versioning of the APIs may incur replication of all or most of the product code implementing those APIs.

However, such code replication is costly and difficult to maintain. Enhancements and bug fixes need to be developed and tested in all versions. Resources that are shared by all code versions, such as database schema, need to support compatibility with all code versions. The cost and complexity further increases with the increase in complexity of the product and introduction of more versions.

There is thus a need for addressing these and/or other issues associated with the prior art.

SUMMARY

A system, method, and computer program product are provided for allowing a plurality of application programming interface (API) versions to interact with a single version of implementation code. In use, at least one first data object is received. Additionally, it is determined whether the at least one first data object is associated with a first data object version corresponding to a first data structure associated with a first API version. Additionally, it is determined whether the first data object version associated with the first data structure is compatible with an implementation code, the implementation code being compatible with a second data object version corresponding to a second data structure associated with a second API version. Moreover, the at least one first data object associated with the first data object version is automatically converted to the second data object version corresponding to the second data structure, such that the at least one first data object is compatible with the implementation code and the second API version.

DETAILED DESCRIPTION

Figure 1:
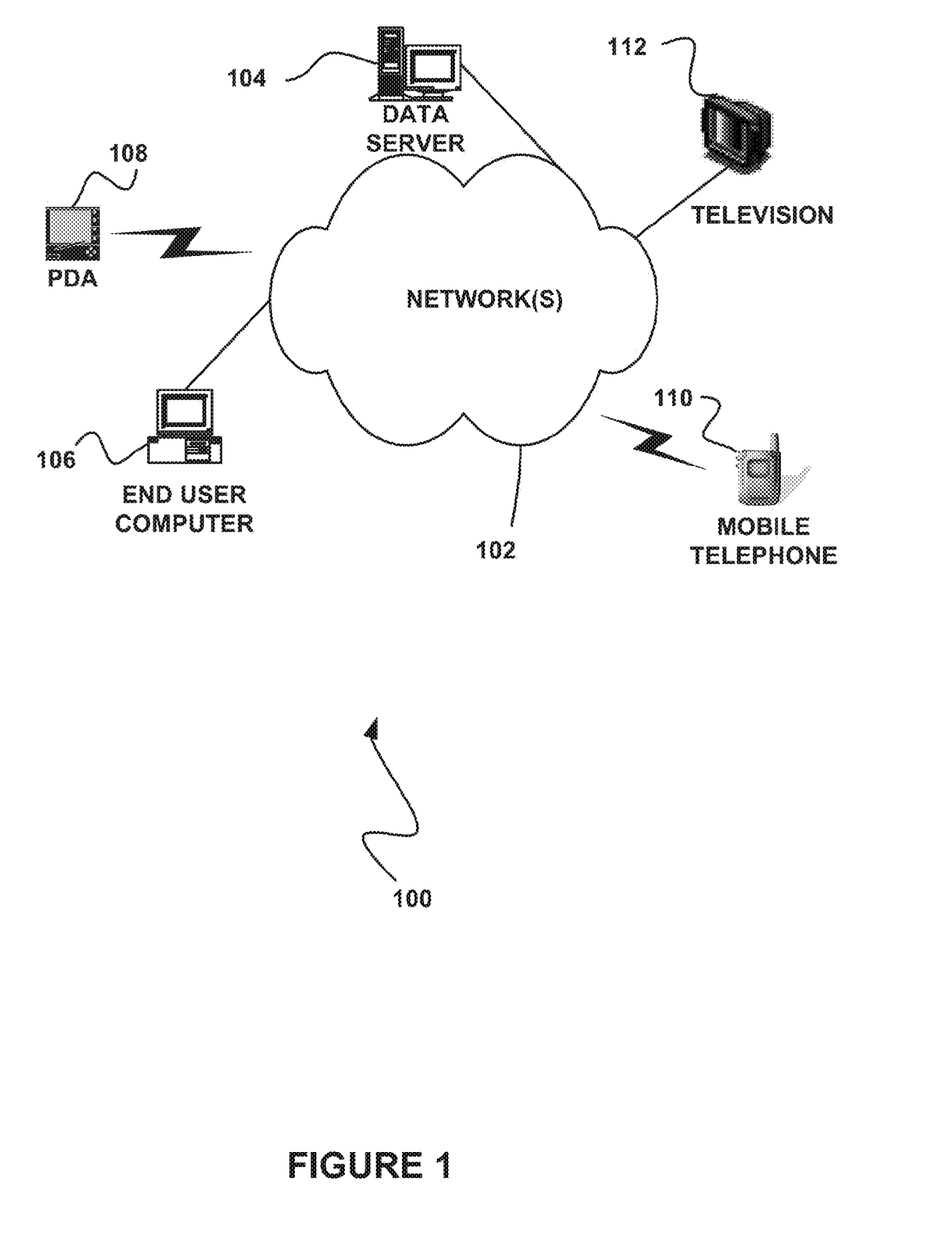
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
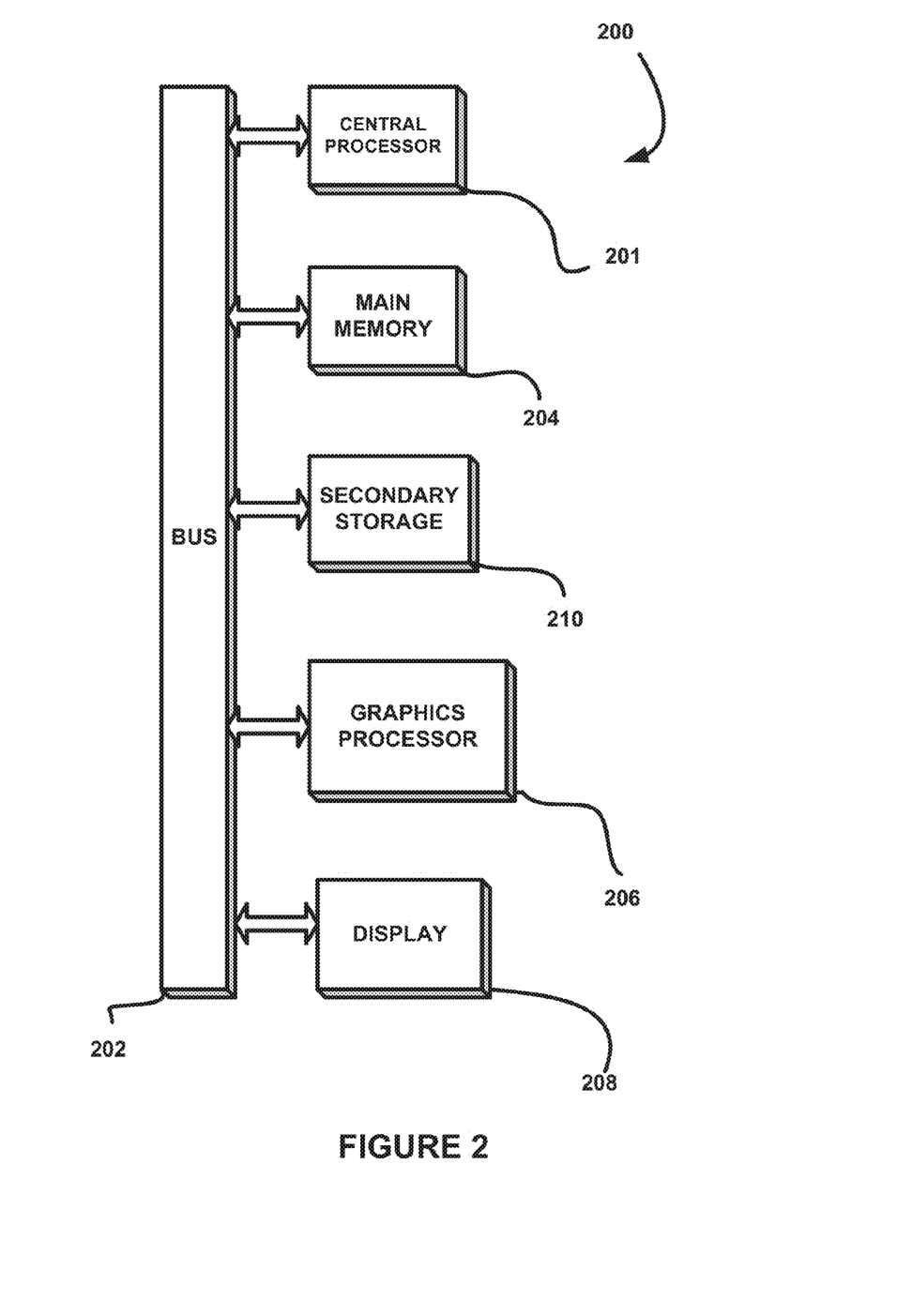
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
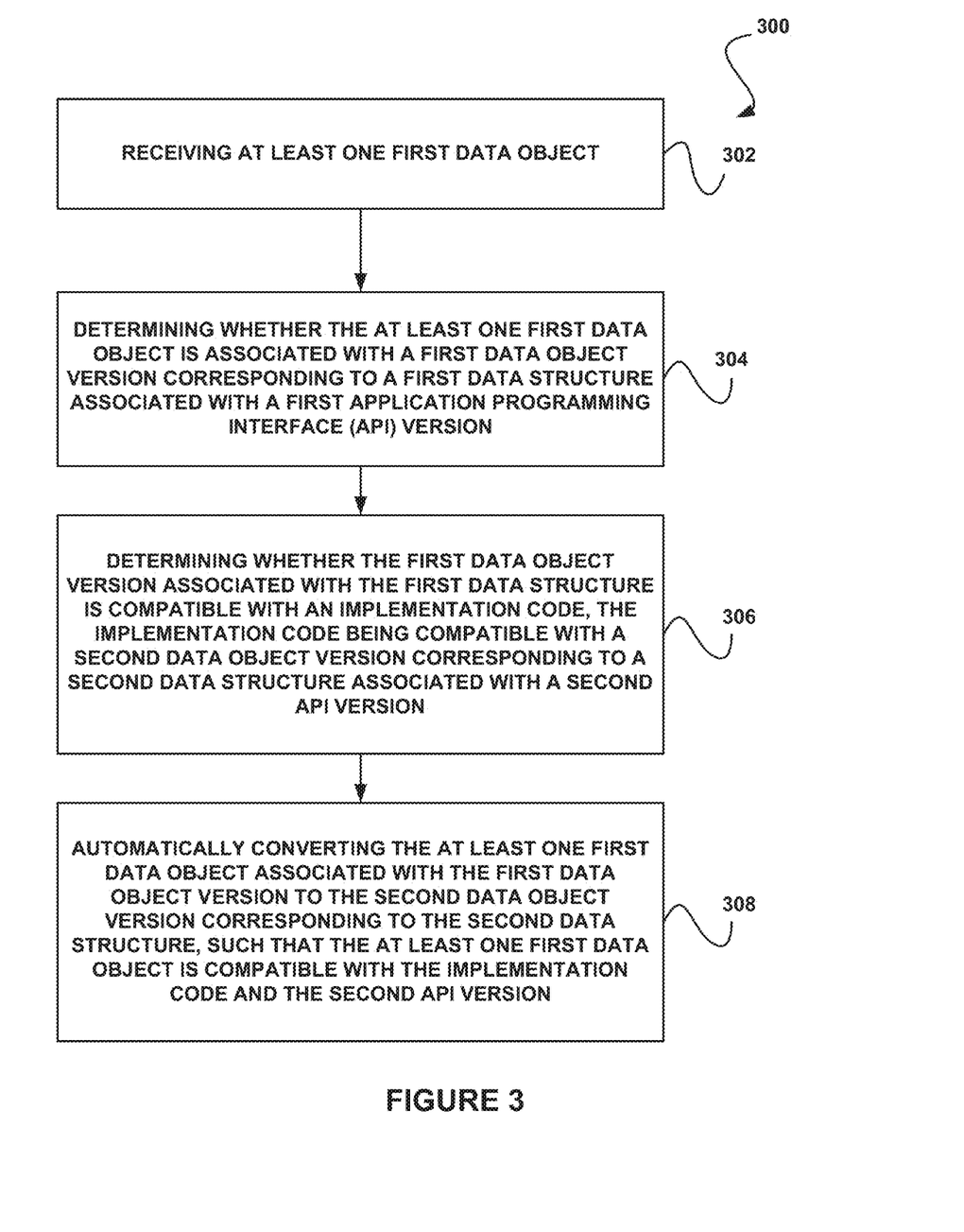
FIG. 3 illustrates a method for allowing a plurality of application programming interface (API) versions to interact with a single version of implementation code, in accordance with one embodiment.

FIG. 3 illustrates a method 300 for allowing a plurality of application programming interface (API) versions to interact with a single version of implementation code, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

In use, at least one first data object is received. See operation 302. As shown further, the method 300 includes determining whether the at least one first data object is associated with a first data object version corresponding to a first data structure associated with a first API version. See operation 304.

In the context of the present description, a data object refers to any runtime instance of at least one data structure. For example, computer servers typically define and implement APIs. Client devices use the APIs to interact with the server. Data is passed between client and the server in the form of data objects. Data objects are runtimes instances of data structures. Each API may be associated with zero or more specific data structures.

In the context of the present description, a data structure refers to any structure of data associated with one or more APIs. For example, the data structure may include a structure and/or format of data compatible with an API. Further, in the context of the present description, an API generally refers to an interface that specifies how some software components should interact with each other.

As shown further in FIG. 3, the method 300 further includes determining whether the first data object version associated with the first data structure is compatible with an implementation code, the implementation code being compatible with a second data object version corresponding to a second data structure associated with a second API version. See operation 306. The implementation code may include any type of code, software, and/or computer program.

Additionally, the at least one first data object associated with the first data object version is automatically converted to the second data object version corresponding to the second data structure, such that the at least one first data object is compatible with the implementation code and the second API version. See operation 308. Utilizing this technique, a single version of implementation code may interact with multiple API versions.

For example, the first API and second API may be different versions because the second API evolved to provide new functionality, etc., (e.g. the first API version may include an older version than the second API version, etc.). In some cases, changing the API may include changing the data structures used by the API. However, changing the data structures of an existing API may break backwards compatibility with existing clients.

Accordingly, the method 300 may function to allow the use of data structures associated with only one version of core implementation code. For example, if the version of the data structures used by a particular version of the API is different than the version of the data structures used by the implementation code, the data objects may be converted from one version to another. In this way, one version of implementation code may accommodate multiple versions of the API.

With further reference to FIG. 3, in one embodiment, the at least one first data object may be received from a client device associated with the first API version. Additionally, the at least one first data object may be received by a server device including the implementation code, the server device being associated with the first API version and the second API version.

In one embodiment, the implementation code may include core product business code. Of course, in various embodiments, the implementation code may include any type of code and/or software program. In one embodiment, the implementation code may be located on a host and/or server. In either case, in one embodiment, automatically converting the at least one first data object associated with the first data object version to the second data object version corresponding to the second data structure may function to allow a single version of the core product business code to interact with a plurality of API versions.

Further, in one embodiment, the implementation code may be associated with one or more customization routines. In this case, determining whether the first data object version associated with the first data structure is compatible with the implementation code may include determining a version of one or more data structures used by at least one of core routines or customization routines associated with the implementation code. In one embodiment, automatically converting the at least one first data object associated with the first data object version to the second data object version corresponding to the second data structure may include converting the at least one first data object associated with the first data object version to a version capable of being utilized by the customization routine.

For example, a software program may allow users and system integrators to customize its behavior. This program may include core routines with functionality that is constant, and customization routines with functionality that may be different for different users or different installations. The core routines may provide hooks in which customization routines may be plugged-in and/or accessed.

Data may be passed between core and customization routines in the form of data objects (which are instances of data structures, etc.). The core routine may define an API that is implemented by customization. Without utilizing the techniques described herein, if the data structures used by the API changes, it may break backward compatibility with customization's implementations. Further, all customization routines may not be changed to use a different version of data structures at once.

Thus, the method 300 may be utilized to ensure backwards compatibility with the customization routines is not broken, even if the data structures used by the core routine changes. For example, in one embodiment, the data objects may automatically be converted from one version to another when they are passed between the core and customization routines.

In one embodiment, the method 300 may further include mapping first data associated with the first data object version corresponding to the first data structure to second data associated with the second data object version corresponding to the second data structure. In this case, automatically converting the at least one first data object associated with the first data object version to the second data object version corresponding to the second data structure may include utilizing the mapping.

Further, in one embodiment, the method 300 may include automatically generating code for mapping the first data associated with the first data object version corresponding to the first data structure to the second data associated with the second data object version corresponding to the second data structure. In this case, the automatically generated code for mapping the first data associated with the first data object version corresponding to the first data structure to the second data associated with the second data object version corresponding to the second data structure may include at least one automatically generated data object convertor.

For example, a system may have multiple versions of the data structures. Data objects might have to be converted from one version to another. However, a large system can typically have a large number of data structures. The logic of mapping data of one version to another version may be labor intensive because manually coding this logic for every data structure is repetitive, voluminous, and error-prone. This task becomes more voluminous as the number of data structures and the number of versions increase.

Accordingly, in one embodiment, logic for mapping data of one version to another may be coded in a computer program which then automatically generates the code (e.g. source or binary, etc.) implementing the logic of data conversion for each data structure. In one embodiment, the generated code may be utilized to convert data objects from one version to another.

Still yet, in one embodiment, the method 300 may further include receiving at least one third data object from a client device and determining the at least one third data object is associated with a third data object version corresponding to a third data structure associated with a third API version, where the third API version is different from the first API version and the second API version. In this case, the at least one third data object associated with the third data object version may be automatically converted to the second data object version corresponding to the second data structure, such that the at least one third data object is compatible with the implementation code.

Converting the first data object associated with the first data object version to the second data object version may include any number of conversion operations with varying complexities. For example, automatically converting the at least one first data object associated with the first data object version to the second data object version corresponding to the second data structure may include copying at least one string field associated with the first data object from a first string field type corresponding to the first data object version to a second string field type associated with the second data object version. As another example, automatically converting the at least one first data object associated with the first data object version to the second data object version corresponding to the second data structure may include a validation operation, a data manipulation operation, a lookup operation to an external data source to obtain mapping logic, and/or any other type of operation, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
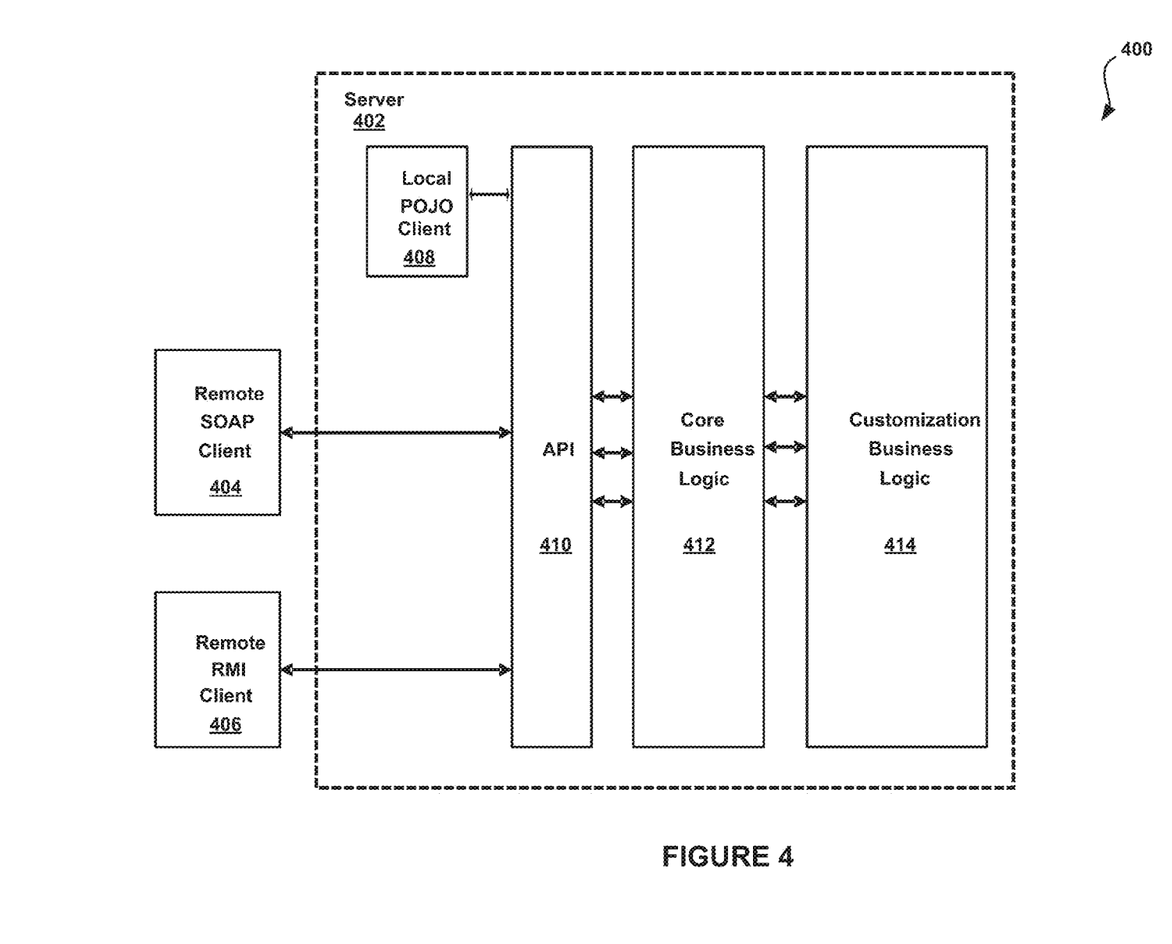
FIG. 4 illustrates a schematic block diagram of a system for allowing a plurality of API versions to interact with a single version of implementation code, in accordance with one embodiment.

FIG. 4 illustrates a schematic block diagram of a system 400 for allowing a plurality of API versions to interact with a single version of implementation code, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, the system 400 includes a server 402. The server 402 is in communication with a plurality of client devices 404, 406, and 408 (e.g. via an API 410, etc.). As an example, the client device 404 may include a remote SOAP (Simple Object Access Protocol) client. As another example, the client device 406 may include a remote RIM (Remote Method Invocation) client. As yet another example, the client device 408 may include a local POJO (Plain Old Java Object) client. Of course, these are only examples, and in various embodiments, any number of clients of various types may be present.

The client devices 404 and 406 are in communication with the API 410 associated with the server 402. The API 410 may function as an interface to core business logic 412, which is in communication with customization business logic 414.

In one embodiment, the server 402 may define and implement APIs utilized in the system 400. Further, the clients 404, 406, and 408 may use the API(s) 410 to interact with the server 402. In operation, data may be passed between the clients 404, 406, and 408 and the server 402 in the form of data objects. Data objects are runtime instances of data structures.

Further, in operation, the system 400 may function such that product business code (e.g. the core business logic 412 and/or the customization business logic 414, etc.) is able interact with multiple API versions. For example, the server 402 may include and implement computer-generated data object convertors and just-in-time adaptation (e.g. as part of the API 410, in one embodiment, etc.). These techniques help to reduce the cost, complexity and time to release new features as well as simplify defect fixing and enhancements.

Moreover, in various embodiments, the server 402 may function to implement multiple versions of API signatures with a single version of underlying business code, enable support for a single version of core product code interacting with different versions of product customizations, utilize computer-generated code to convert data objects from one version to another, and/or utilize just-in-time adaptation for data objects passed between core and customization code, etc.

For example, in one embodiment, the server 402 may include logic for mapping data of one version to another, where such logic is coded in a computer program, which then generates the code (source or binary) implementing the logic of data conversion for each data structure. In this case, the generated code may include computer code to convert data objects from one version to another. In various embodiments, this may be implemented to reduce development and testing effort to introduce new data structures, thus significantly reducing overall project cost and eliminate human errors. Furthermore, bug fixes and enhancements would be simple to deploy and the time to release newer versions would be reduced.

Figure 5:
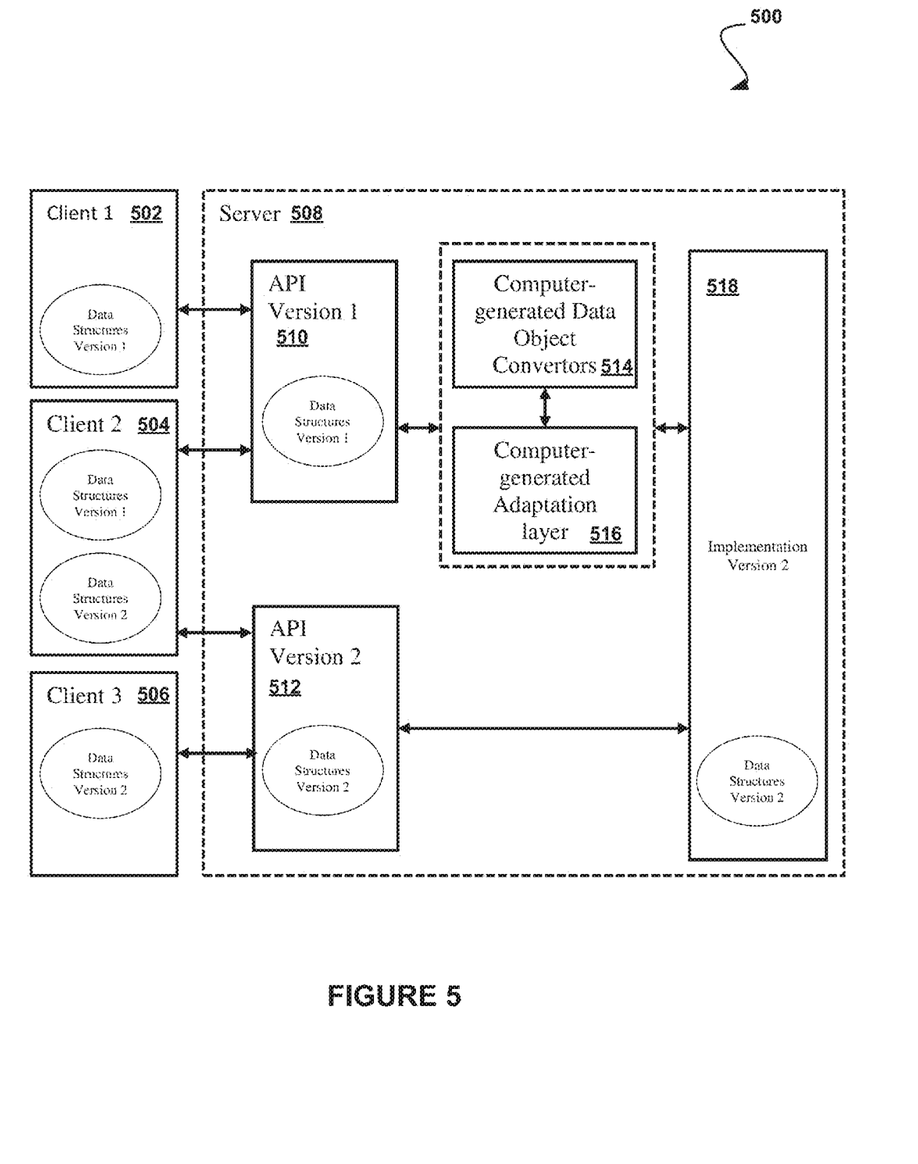
FIG. 5 illustrates a schematic block diagram of a system for allowing a plurality of API versions to interact with a single version of implementation code, in accordance with another embodiment.

FIG. 5 illustrates a schematic block diagram of a system 500 for allowing a plurality of API versions to interact with a single version of implementation code, in accordance with another embodiment. As an option, the system 500 may be implemented in the context of the details of FIGS. 1-4. Of course, however, the system 500 may be implemented in the context of any desired environment. Further, the aforementioned definitions may equally apply to the description below.

As shown, the system 500 includes a server 508. The server 508 is in communication with a plurality of client devices 502, 504, and 506 (via an API 510, and/or an API 512, etc.). In one embodiment, the client device 502 may be associated with a first data structure associated with a first version. Furthermore, the client device 504 may be associated with the first data structure associated with a first version and a second data structure associated with a second version. Additionally, in one embodiment, the client device 506 may be associated with the second data structure associated with the second version and/or a third data structure associated with a third version.

The client devices 502 and 504 are further in communication with one or more APIs 510 associated with the server 508. The API 510 may function as an interface to implementation code 518. In operation, the first API 510 associated with the first version may receive at least one first data object from the first client device 502 or the second client device 504. At least one computer generated data object converter 514 may work in conjunction with at least one computer generated adaptation layer 516 to determine the first data object is associated with a first data object version corresponding to a first data structure associated with a first API version.

The computer generated adaptation layer 516 may further determine whether the first data object version is compatible with the implementation code 518, the implementation code being compatible with a second data object version corresponding to a second data structure associated with a second API version 512. The computer generated adaptation layer 516 may further work with the computer generated data object converter 514 to automatically convert the first data object associated with the first data object version to the second data object version corresponding to the second data structure, such that the first data object is compatible with the implementation code 518.

As shown further, in one embodiment, the second client device 504 and the third client device 506 may send a data object associated with the second version to the second API version 512, which may then communicate with the implementation code 518, without conversion. Of course, if the third client device 506 was compatible with a third version of an API, the computer generated data object converter 514 (or another convertor) could be used to convert a third data object associated with a third data structure version to be compatible with the implementation code 518. In various embodiments, any number of client devices representing a variety of versions may be accommodated.

As an example of the different API and data structure versions, a first API may represent createCustomer (v1.Name name, v1.SocialSecurityNumber id), where v1.Name type contains 3 String fields (firstName, middleName, lastName), and v1.SocialSecurityNumber type contains a field of type 'integer'. On the other hand, a second new version of the createCustomer API may be createCustomer(v2.Name name, v2.SocialSecurityNumber id), where v2.Name type is identical to v1.Name type, but v2.SocialSecurityNumber contains a field of type 'long integer'. Thus, in one embodiment, the data object converter 514 may be utilized to convert data objects associated with the first version to be compatible with the second version of the code.

Figure 6:
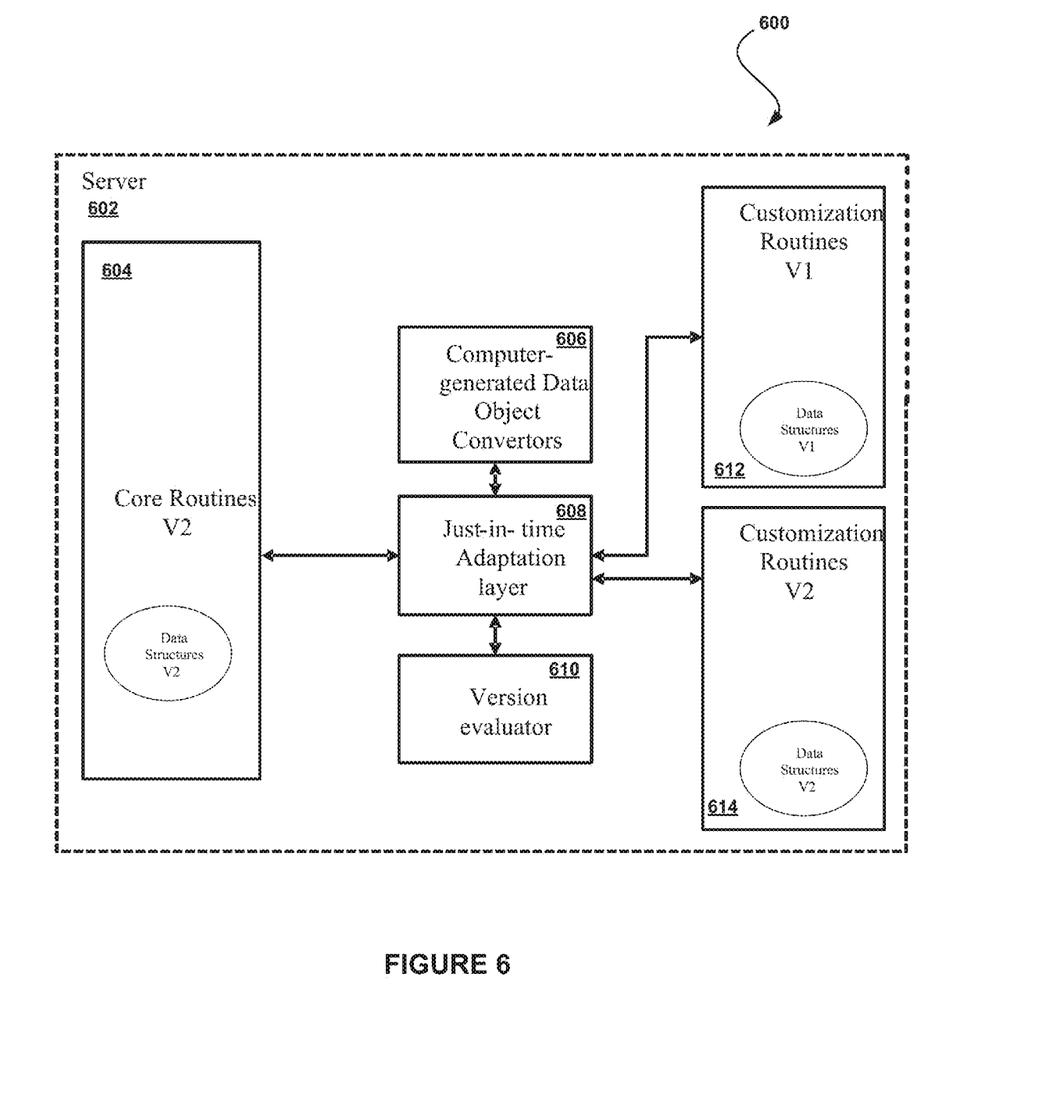
FIG. 6 illustrates a schematic block-diagram of a system for allowing a plurality of API versions to interact with a single version of implementation code, in accordance with another embodiment.

FIG. 6 illustrates a schematic block diagram of a system 600 for allowing a plurality of API versions to interact with a single version of implementation code, in accordance with another embodiment. As an option, the system 600 may be implemented in the context of the details of FIGS. 1-5. Of course, however, the system 600 may be implemented in the context of any desired environment. Further, the aforementioned definitions may equally apply to the description below.

As shown, the system 600 includes a server 602. The server 602 includes core routines 604 (e.g. associated with a second version, etc.). Further, the server 602 includes a computer generated data object convertor 606, a just-in-time adaptation layer 608, and a version calculator 610, which may function to determine data object versions and convert the data objects to compatible versions. Further, the server 602 includes at least one customization routine 612 (e.g. associated with a first version, etc.) and at least one customization routine 614 (e.g. associated with a second version, etc.).

In operation, the core routines 604 of a single version may interact with customization routines 612 and 614 of different versions by using the services of the just-in-time adaptation layer 608.

For example, in a particular runtime environment, some customization routines may use new version of data structures and some customization routines may continue to use older version of data structures. Before a call is dispatched to the customization routine, the just-in-time adaptation layer 608 may use the version calculator 610 to determine the version of data objects supplied by the core routines 604 and the version of the data structures used by the customization routines 612 and 614. Further, the just-in-time adaptation layer 608 may compare the version of data objects used by the core routines 604 with the version of data structures used by the customization routines 612 and 614. If the versions do not match, the data objects may be converted to the version used by customization routines by using computer-generated data object convertor 606. Similar data conversion logic may be applied to convert data objects returned by customization routines before these objects are presented to the core routines, as illustrated in FIG. 7.

The system 600 may implement just-in-time adaptation. The decision whether to convert data objects from one version to another may be taken dynamically at runtime by determining the version of data structures used by core and customization routines. As an example, when using Java programming language, the version of the data structures can be determined by using Java Reflection API.

In one embodiment, in order to reduce the cost of maintenance, a system may deprecate older versions of the data structures when newer versions are introduced. Deprecated data structures may be subsequently deleted in later releases. In such cases, customization routines could start using newer versions of data structures at some point of time. However, in some cases, it may not be feasible to change all customization routines at once. The system 600 may function to allow a gradual change of customization routines to use newer versions of data structures.

Figure 7:
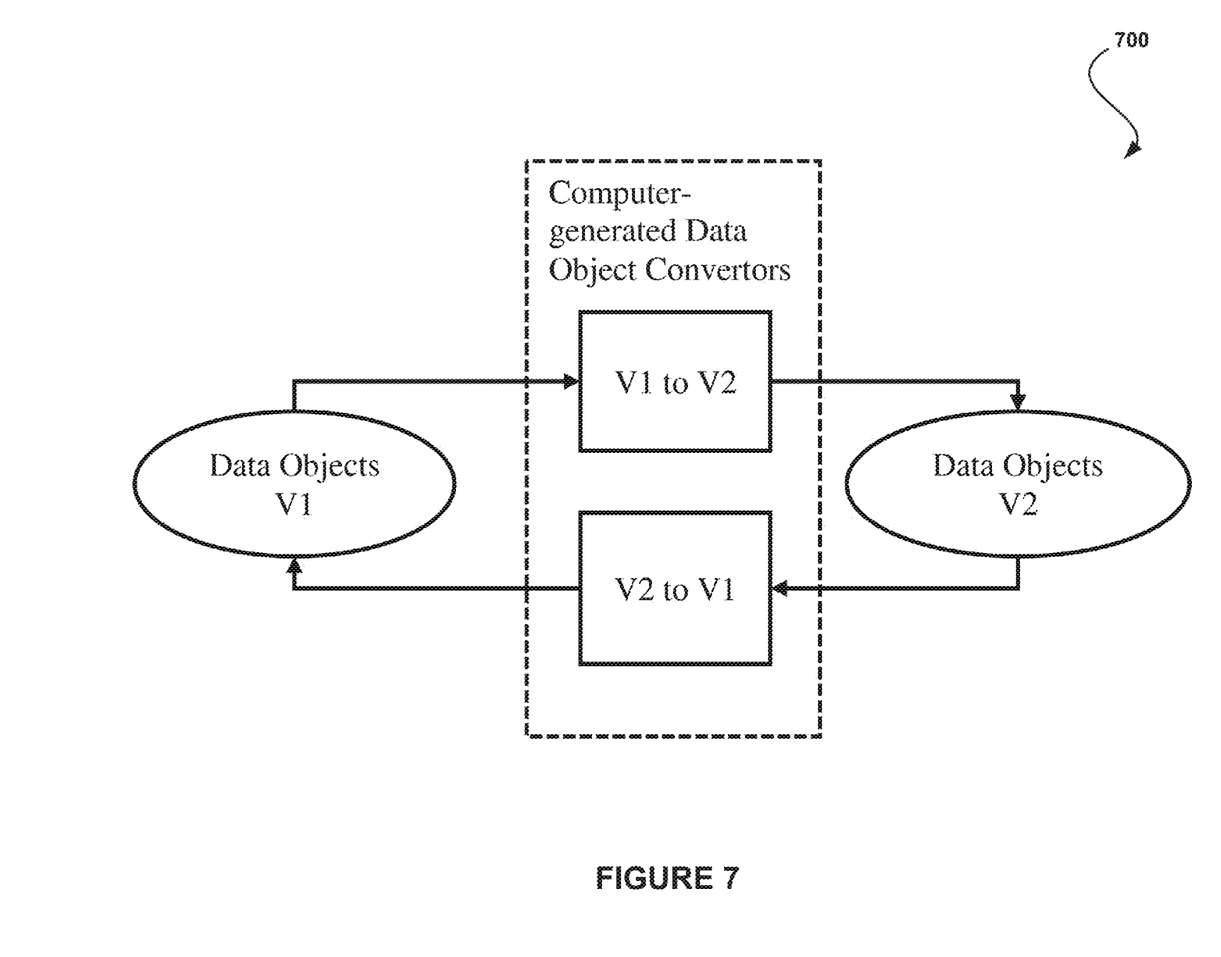
FIG. 7 illustrates a schematic block diagram of a system for allowing a plurality of API versions to interact with a single version of implementation code, in accordance with another embodiment.

FIG. 7 illustrates a schematic block diagram of a system 700 for allowing a plurality of API versions to interact with a single version of implementation code, in accordance with another embodiment. As an option, the system 700 may be implemented in the context of the details of FIGS. 1-6. Of course, however, the system 700 may be implemented in the context of any desired environment. Further, the aforementioned definitions may equally apply to the description below.

As shown, the system 700 illustrates the function of computer-generated data object convertors, in accordance with one embodiment. As one example of operation, the conversion from v1.Name type to v2.Name type may involve a copying of String fields from one type to another. As another example, the conversion of v1.SocialSecurityNumber type to v2.SocialSecurityNumber type may involve validation, data manipulation, or possibly a lookup in an external data source to obtain the mapping logic, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for receiving at least one first data object;
   computer code for automatically determining that the at least one first data object is associated with a first data object version corresponding to a first data structure associated with a first application programming interface (API) version;
   computer code for automatically determining that the file first data object version associated with the first data structure is compatible with an implementation code, the implementation code being compatible with a second data object version corresponding to a second data structure associated with a second API version;
   computer code for automatically generating computer code for mapping first data associated with the first data object version corresponding to the first data structure to second data associated with the second data object version corresponding to the second data structure; and
   computer code for automatically converting the at least one first data object associated with the first data object version to the second data object version corresponding to the second data structure, such that the at least one first data object is compatible with the implementation code and the second API version.

2. The computer program product of claim 1, wherein the computer program product is operable such that the at least one first data object is received from a client device associated with the first API version.

3. The computer program product of claim 1, wherein the computer program product is operable such that the at least one first data object is received by a server device including the implementation code, the implementation code being compatible with a second data structure associated with the second API version.

4. The computer program product of claim 1, wherein the computer program product is operable such that the implementation code includes product business code.

5. The computer program product of claim 4, wherein the computer program product is operable such that automatically converting the at least one first data object associated with the first data object version to the second data object version corresponding to the second data structure functions to allow a single version of the core product business code to interact with a plurality of API versions.

6. The computer program product of claim 1, wherein the computer program product is operable such that automatically converting the at least one first data object associated with the first data object version to the second data object version corresponding to the second data structure includes utilizing the mapping.

7. The computer program product of claim 1, wherein the computer program product is operable such that the automatically generated computer code for mapping the first data associated with the first data object version corresponding to the first data structure to the second data associated with the second data object version corresponding to the second data structure includes at least one automatically generated data object convertor.

8. The computer program product of claim 1, wherein the computer program product is operable such that determining whether the first data object version associated with the first data structure is compatible with the implementation code occurs at runtime.

9. The computer program product of claim 1, wherein the computer program product is operable such that determining whether the first data object version associated with the first data structure is compatible with the implementation code includes determining a version of one or more data structures used by at least one of core routines or customization routines associated with the implementation code.

10. The computer program product of claim 1, wherein the computer program product is operable such that the first API version includes an older version than the second API version.

11. The computer program product of claim 1, further comprising:
    computer code for receiving at least one third data object from a client device; and
    computer code for determining the at least one third data object is associated with a third data object version corresponding to a third data structure associated with a third API version, the third API version being different from the first API version and the second API version.

12. The computer program product of claim 11, further comprising:
    computer code for automatically converting the at least one third data object associated with the third data object version to the second data object version corresponding to the second data structure, such that the at least one third data object is compatible with the implementation code.

13. The computer program product of claim 1, wherein the computer program product is operable such that the implementation code is associated with one or more customization routines.

14. The computer program product of claim 13, wherein the computer program product is operable such that automatically converting the at least one first data object associated with the first data object version to the second data object version corresponding to the second data structure includes converting the at least one first data object associated with the first data object version to a version capable of being utilized by the customization routine.

15. The computer program product of claim 1, wherein the computer program product is operable such that automatically converting the at least one first data object associated with the first data object version to the second data object version corresponding to the second data structure includes copying at least one string field associated with the first data object from a first string field type corresponding to the first data object version to a second string field type associated with the second data object version.

16. The computer program product of claim 1, wherein the computer program product is operable such that automatically converting the at least one first data object associated with the first data object version to the second data object version corresponding to the second data structure includes at least one of a validation operation, a data manipulation operation, or a lookup operation to an external data source to obtain mapping logic.

17. A method, including:
    receiving, by a computer comprising a memory and one or more processing cores coupled to the memory, at least one first data object;
    automatically determining that the at least one first data object is associated with a first data object version corresponding to a first data structure associated with a first application programming interface (API) version;

automatically determining that the first data object version associated with the first data structure is compatible with an implementation code, the implementation code being compatible with a second data object version corresponding to a second data structure associated with a second API version;

automatically generating computer code for mapping first data associated with the first data object version corresponding to the first data structure to second data associated with the second data object version corresponding to the second data structure; and automatically converting the at least one first data object associated with the first data object version to the second data object version corresponding to the second data structure, such that the at least one first data object is compatible with the implementation code and the second API version.

18. A system comprising:
a memory system; and one or more processing cores coupled to the memory system and that are each configured to:

receive at least one first data object;

automatically determine that the at least one first data object is associated with a first data object version corresponding to a first data structure associated with a first application programming interface (API) version;

automatically determine that the first data object version associated with the first data structure is compatible with an implementation code, the implementation code being compatible with a second data object version corresponding to a second data structure associated with a second API version;

automatically generate computer code for mapping first data associated with the first data object version corresponding to the first data structure to second data associated with the second data object version corresponding to the second data structure; and automatically converting the at least one first data object associated with the first data object version to the second data object version corresponding to the second data structure, such that the at least one first data object is compatible with the implementation code and the second API version.

* * * * *

UNITED STATES PATENT AND TRADEMARK OFFICE
CERTIFICATE OF CORRECTION

PATENT NO. : 9,063,748 B1
APPLICATION NO. : 14/199905
DATED : June 23, 2015
INVENTOR(S) : Rahul Dattatray Bakale et al.

It is certified that error appears in the above-identified patent and that said Letters Patent is hereby corrected as shown below:

Title page

Item (72) Inventors; please replace "Kaylan" with --Kaylan-West--.

Signed and Sealed this
Twenty-fourth Day of November, 2015

Michelle K. Lee
*Director of the United States Patent and Trademark Office*